United States Patent
Cutler et al.

(10) Patent No.: US 10,012,320 B2
(45) Date of Patent: Jul. 3, 2018

(54) HOT AND COLD WATER SWITCHING VALVE

(71) Applicant: KYLIN SANITARY TECHNOLOGY (XIAMEN) CO., LTD., Xiamen, Fujian (CN)

(72) Inventors: Kyle William Cutler, Fujian (CN); Qingshuang Li, Fujian (CN); Hui Huang, Fujian (CN); Boqing Wu, Fujian (CN)

(73) Assignee: KYLIN SANITARY TECHNOLOGY (XIAMEN) CO., LTD., Xiamen, Fujian Province (CN)

( * ) Notice: Subject to any disclaimer, the term of this patent is extended or adjusted under 35 U.S.C. 154(b) by 0 days.

(21) Appl. No.: 15/536,608

(22) PCT Filed: Jul. 14, 2016

(86) PCT No.: PCT/CN2016/089991
§ 371 (c)(1),
(2) Date: Jun. 15, 2017

(87) PCT Pub. No.: WO2017/012497
PCT Pub. Date: Jan. 26, 2017

(65) Prior Publication Data
US 2017/0350519 A1    Dec. 7, 2017

(30) Foreign Application Priority Data

Jul. 20, 2015  (CN) .................. 2015 2 0526242 U

(51) Int. Cl.
*F16K 11/074*    (2006.01)
*F16K 11/22*     (2006.01)
(Continued)

(52) U.S. Cl.
CPC .............. *F16K 11/22* (2013.01); *F16K 11/14* (2013.01); *E03B 1/048* (2013.01); *Y10T 137/7737* (2015.04); *Y10T 137/86509* (2015.04)

(58) Field of Classification Search
CPC ........... F16K 11/22; F16K 11/14; E03B 1/048
(Continued)

(56) References Cited

U.S. PATENT DOCUMENTS 2,842,155 A * 7/1958 Peters ................. G05D 23/1326
                                                         122/13.3
5,564,462 A * 10/1996 Storch ................. F24D 17/0078
                                                         122/13.3
(Continued)

FOREIGN PATENT DOCUMENTS

AU      2007203241 A1    1/2008
CN         1851300 A    10/2006
(Continued)

*Primary Examiner* — Umashankar Venkatesan
(74) *Attorney, Agent, or Firm* — Muncy, Geissler, Olds & Lowe, P.C.

(57) ABSTRACT

A hot and cold water switching valve includes a valve body, a switching valve element, a switch valve element and a thermal sensing valve element, wherein the valve body has an inflow channel, a recovery channel and an outflow channel; one end of the three channels is communicated in the valve body; the switching valve element is provided in such a position where the three channels are communicated with each other and used for switching the outflow mode; the switch valve element is provided in the outflow channel and used for opening or closing the outflow, and the thermal sensing valve element is provided in the recovery channel and used for closing the channel when the water temperature is higher than the set temperature; and a sprinkler used for
(Continued)

automatic outflow of cold water, comprising a sprinkler body and the above-mentioned hot and cold water switching valve.

6 Claims, 8 Drawing Sheets

(51) Int. Cl.
  *F16K 11/14* (2006.01)
  *E03B 1/04* (2006.01)
(58) Field of Classification Search
  USPC .............................. 137/625.11, 625.12, 468
  See application file for complete search history.

(56) References Cited

U.S. PATENT DOCUMENTS

| 7,731,097 | B2* | 6/2010 | Honeychurch | ........... E03B 1/04 |
| | | | | 236/12.19 |
| 8,245,946 | B2* | 8/2012 | Greenthal | ................. E03B 1/04 |
| | | | | 137/337 |
| 8,616,462 | B2* | 12/2013 | Schneider | ............... E03B 1/048 |
| | | | | 137/468 |
| 8,740,098 | B2* | 6/2014 | Greenthal | ................. E03B 1/04 |
| | | | | 137/100 |
| 2017/0362802 | A1* | 12/2017 | Gong | ...................... E03B 1/048 |

FOREIGN PATENT DOCUMENTS

| CN | 101031694 A | 9/2007 |
| CN | 103016790 A | 4/2013 |
| CN | 203202295 U | 9/2013 |
| CN | 203847772 U | 9/2014 |
| CN | 204828794 U | 12/2015 |
| EP | 2628985 A2 | 8/2013 |
| EP | 2628985 A8 | 10/2013 |
| EP | 2628985 A3 | 3/2015 |

* cited by examiner

HOT AND COLD WATER SWITCHING VALVE

BACKGROUND OF THE INVENTION

Technical Field

The present invention relates to a valve, and more specifically, to a hot and cold water switching valve used for switching an outflow channel according to an inflow temperature.

Description of Related Art

In daily life, hot water needs to be used for taking a shower, washing dishes and clothes, especially on occasions where a remote supply of hot water is used. When a valve is opened, the remaining water in the pipeline is cold, so the temperature will not slowly come up until the cold water runs off; the pipeline is also cold, so in order to make the temperature of the outflow reach an appropriate temperature, the water needs to heat up the pipeline, which causes a relatively slow rise of the water temperature and a waste of cold water since more water will run off. In view of this situation, people have developed some valves which can automatically switch a hot or cold water outflow channel to save water resources.

Chinese Patent ZL201210582047.4, published on Jun. 4, 2014, discloses an automatic cold and hot water flow distribution valve comprising a valve body, which has a valve chamber, provided with a water inlet, a cold water outlet and a hot water outlet communicated with the valve chamber in which and a valve element of a piston structure is further provided, wherein a two-way shape memory alloy is further connected between the valve element and the valve body, with the phase transition temperature of the two-way shape memory alloy between 40-55° C.; when the temperature of the two-way shape memory alloy is lower than the phase transition temperature, the valve element is able to block the hot water outlet and form a channel between the inlet and the cold water outlet, and when the temperature of the two-way shape memory alloy is higher than the phase transition temperature, the occurrence of a deformation can cause the displacement of the valve element which will block the cold water outlet and form a channel between the inlet and the hot water outlet.

BRIEF SUMMARY OF THE INVENTION

The objective of the present invention is to provide a hot and cold water switching valve which can flexibly control the hot water outflow while avoiding the waste of cold water.

To solve the above-mentioned technical problems, the technical solution adopted in the present invention is as follows: a hot and cold water switching valve, comprising a valve body, a switching valve element, a switch valve element and a thermal sensing valve element, wherein the valve body is provided with an inflow channel, a recovery channel and an outflow channel, one end of the three channels is communicated in the valve body, the switching valve element is provided in such a position where the three channels are communicated with each other in the valve body and used for switching the outflow mode between the recovery channel and the outflow channel, the switch valve element is provided in the outflow channel and used for opening or closing the outflow, and the thermal sensing valve element is provided in the recovery channel and used for closing the channel when the water temperature is higher than the set temperature.

In the above-mentioned hot and cold water switching valve, the switching valve element comprises a valve rod, a knob and two sealing rings, wherein the valve rod extends axially and an axial end of the valve rod is provided throughout in such a position where the three channels are communicated with each other in the valve body, the valve rod located in the valve body is provided with a guide groove which partially extends in the circumferential direction of the valve rod, the two sealing rings are axially provided on both sides of the guide groove respectively, the other end of the valve rod is located on the outer side of the valve body, the knob is fixedly connected with the valve rod, and a limiting device is provided between the knob and the valve body for controlling the rotation angle of the valve rod.

In the above-mentioned hot and cold water switching valve, the valve body is provided with a limiting groove which has an opening angle of 90 degrees, and the knob is provided with a lug which is inserted in the limiting groove, the lug and the limiting groove constitute the limiting device.

In the above-mentioned hot and cold water switching valve, the thermal sensing valve element comprises a spring, a thermosensitive spring and a mandrel, wherein the mandrel is movably provided in the recovery channel and has a shoulder in the middle thereof; one end of the thermosensitive spring is provided on the valve body near the inlet of the recovery channel, with the other end provided against one end of the mandrel; one end of the spring is provided on the valve body near the outlet of the recovery channel, with the other end provided against the other end of the mandrel; the recovery channel is provided with a step matched with the shoulder, and a sealing device is provided between the shoulder and the step.

In the above-mentioned hot and cold water switching valve, the switch valve element comprises a valve sleeve, a second mandrel, a reset spring and a button, wherein the valve sleeve is fixedly provided in the outflow channel and is of a hollowly cylindrical structure, and an inlet is provided in the middle part of the valve sleeve while an outlet communicated with the inlet is provided on the axial end of the valve sleeve; the second mandrel is axially movably provided in the valve sleeve, and the axial end of the second mandrel is provided with a convex ring matched with the outlet of the valve sleeve, with a sealing device provided between the convex ring and the outlet and a button rotatably provided on the outer side of the valve body via a pivot, while the other end of the second mandrel extends to the outer side of the valve body and is movably connected with the button; one end of the reset spring is provided against the inside wall near the outlet of the valve sleeve while the other end is provided against the side of the second mandrel near the button.

In the above-mentioned hot and cold water switching valve, the switch valve element comprises a valve sleeve, a second mandrel, a reset spring and a button, wherein the valve sleeve is fixedly provided in the outflow channel and is of a hollowly cylindrical structure, and an inlet is provided in the middle part of the valve sleeve while an outlet communicated with the inlet is provided on the axial end of the valve sleeve; the second mandrel is axially movably provided in the valve sleeve, and the axial end of the second mandrel is provided with a convex ring matched with the outlet of the valve sleeve, with a sealing device provided between the convex ring and the outlet and a button rotatably provided on the outer side of the valve body via a pivot, while the other end of the second mandrel extends to the outer side of the valve body and is movably connected with the button; one end of the reset spring is provided against the inside wall near the outlet of the valve sleeve while the other end is provided against the side of the second mandrel near the button.

According to the above-mentioned technical solution, the beneficial effects of the present invention are as below: the water can flow directly from the inflow channel to the outflow channel by way of switching the valve element in summer or when no hot water is required, so the outflow channel can be opened or closed by means of the switch valve element just like the normal opening and closing of a faucet, and in this case the recovery channel remains in a constantly closed state; when winter comes or when hot water is required, because there is a distance from the water heater to the switching valve and meanwhile the pipeline where the water flows through also needs to be preheated by the water flow, the outflow in the previous period of time needs to be recovered, and in this case the switching valve element can be opened so that the water flow can flow from the inflow channel to the recovery channel for recovery; when the temperature of the water flow reaches a set temperature, such as 40 to 50° C., the thermosensitive spring of the recovery channel is heated and extends, with the elastic force greater than the resilience of the spring, which pushes the displacement of the second mandrel to realize the closure of the shoulder and the step so as to close the recovery channel, so in this way hot water will not be wasted; in this case the switching valve element is switched to a position where the water flows from the inflow channel to the outflow channel so that hot water can be used by means of the switch valve element; the technical solution of the present invention brings convenience no matter whether in a cold or hot water outflow mode.

DETAILED DESCRIPTION OF THE INVENTION

Figure 1:
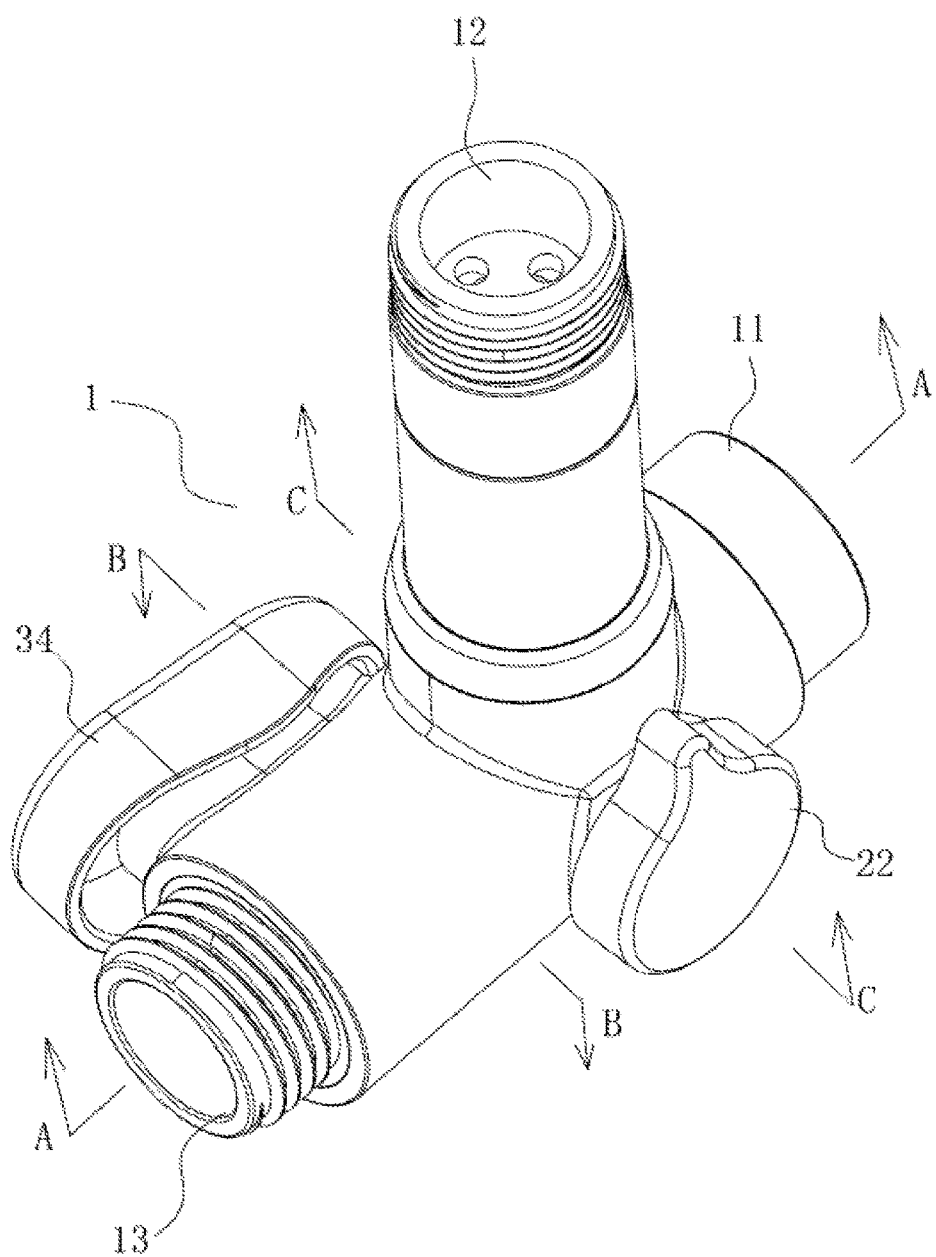
FIG. 1 is a perspective view of Embodiment 1 of the present invention.
Figure 2:
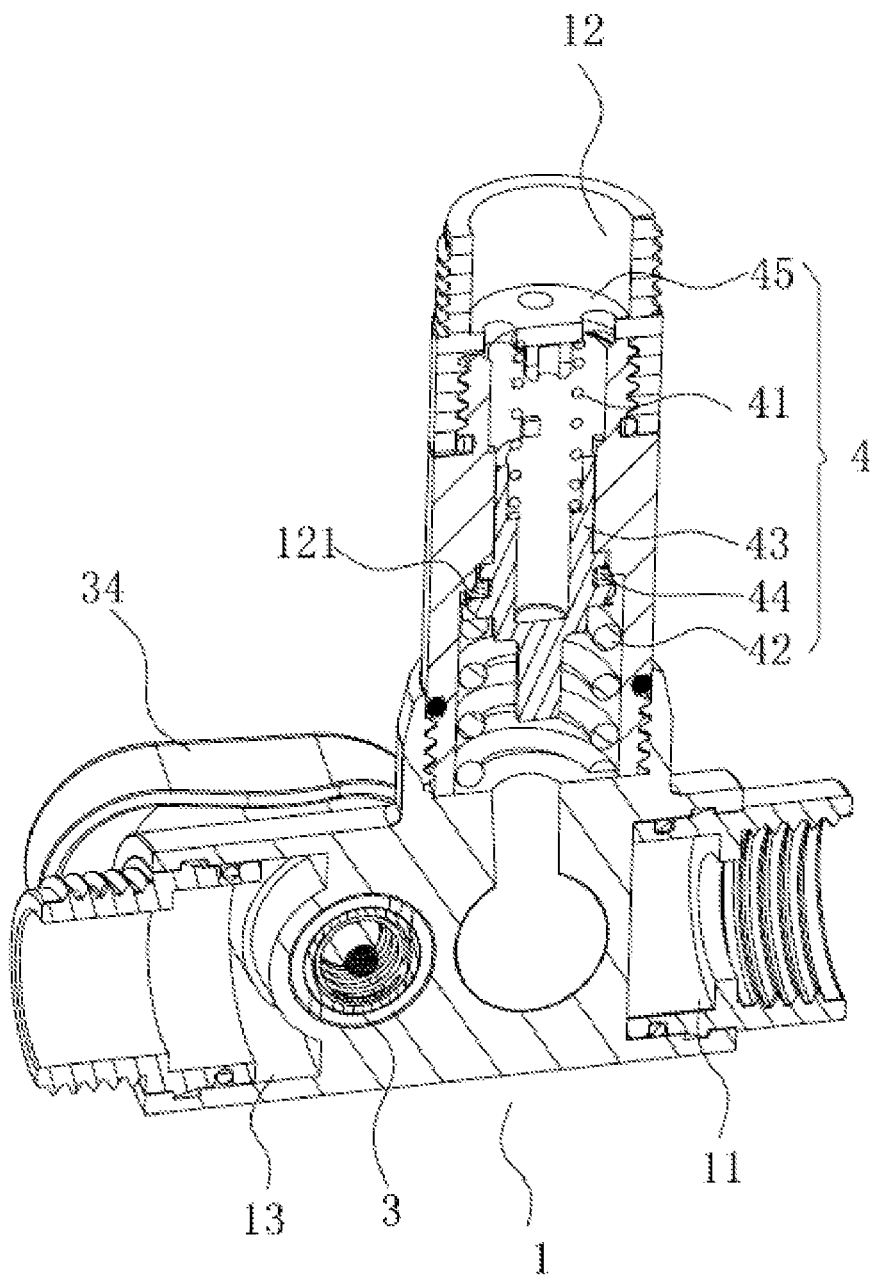
FIG. 2 is a perspective cross-sectional view of A-A in FIG. 1.
Figure 3:
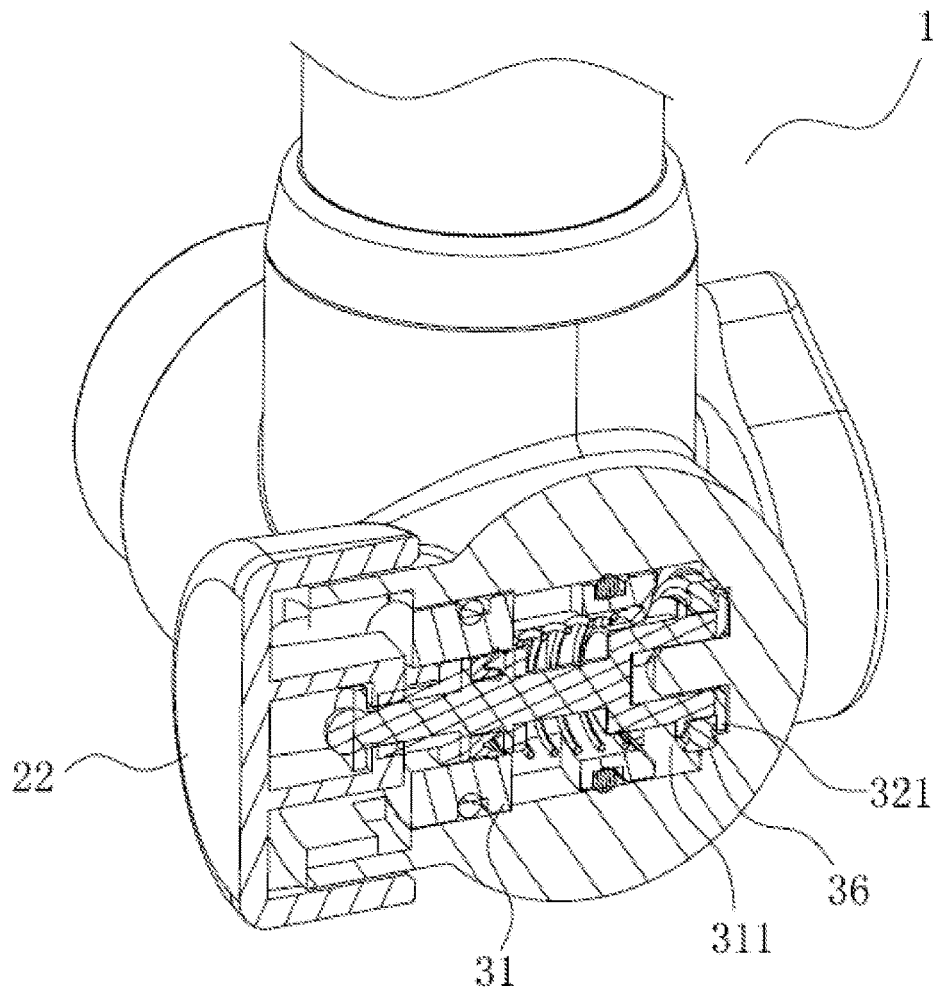
FIG. 3 is a perspective cross-sectional view of B-B in FIG. 1.
Figure 4:
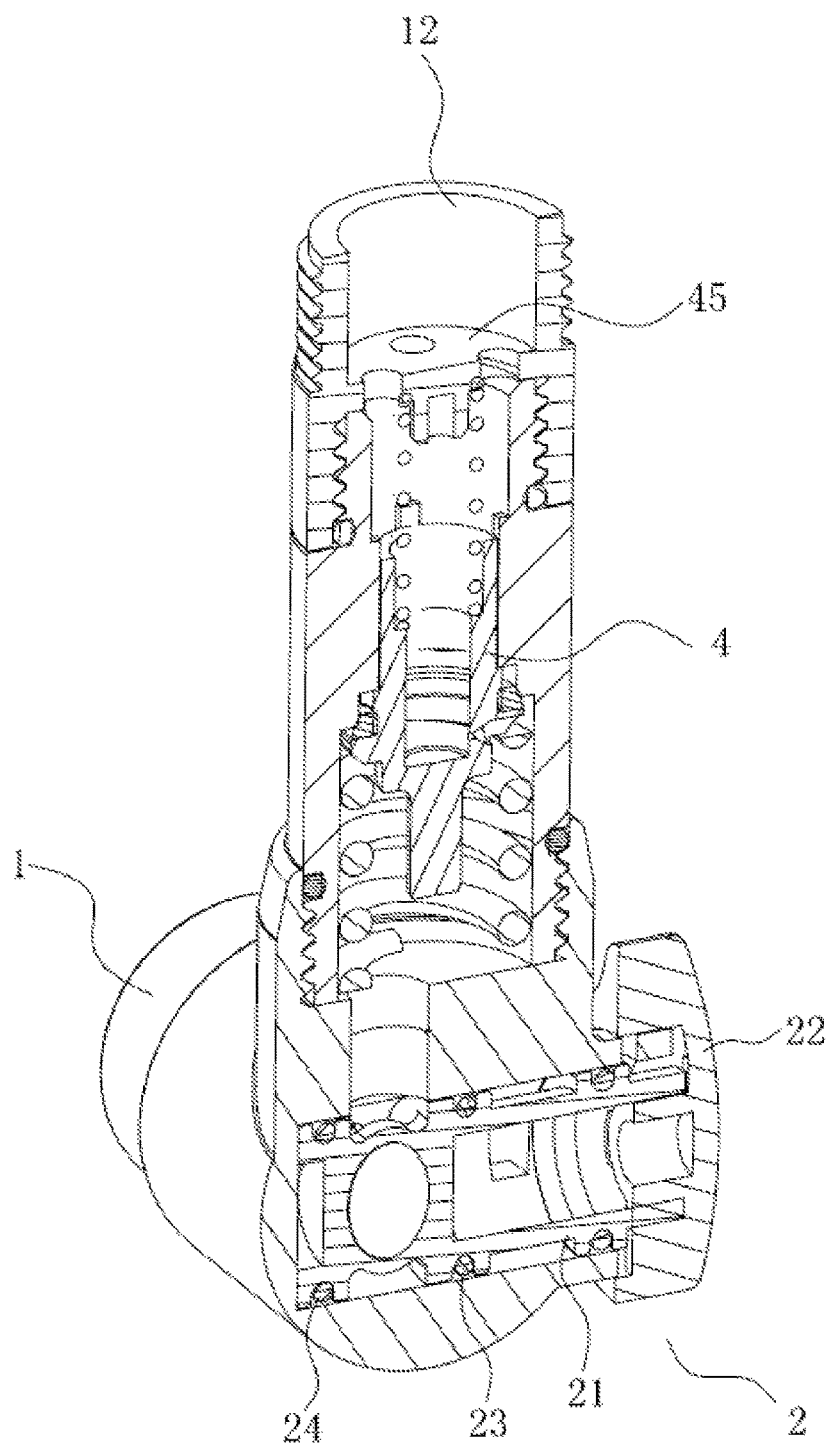
FIG. 4 is a perspective cross-sectional view of C-C in FIG. 1.
Figure 5:
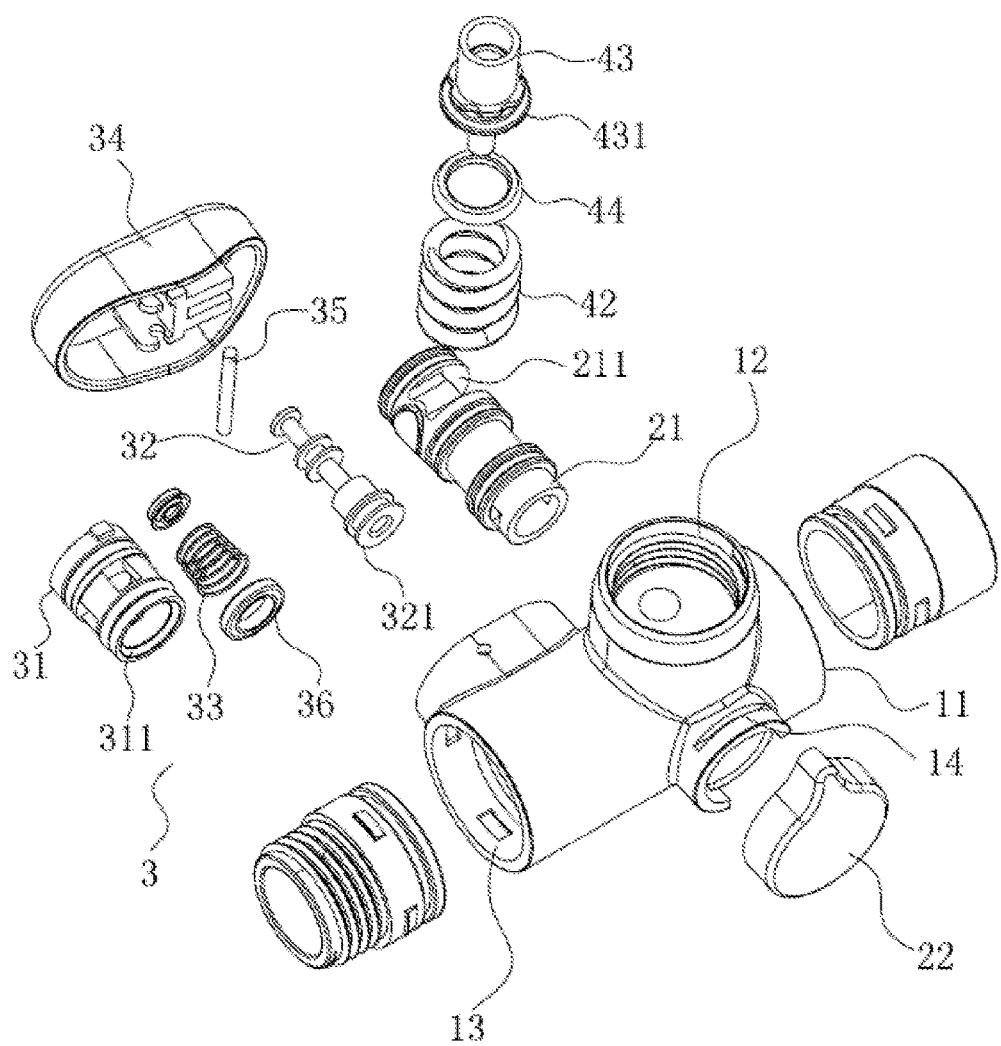
FIG. 5 is a perspective exploded view of some of the components in FIG. 1.
Figure 6:
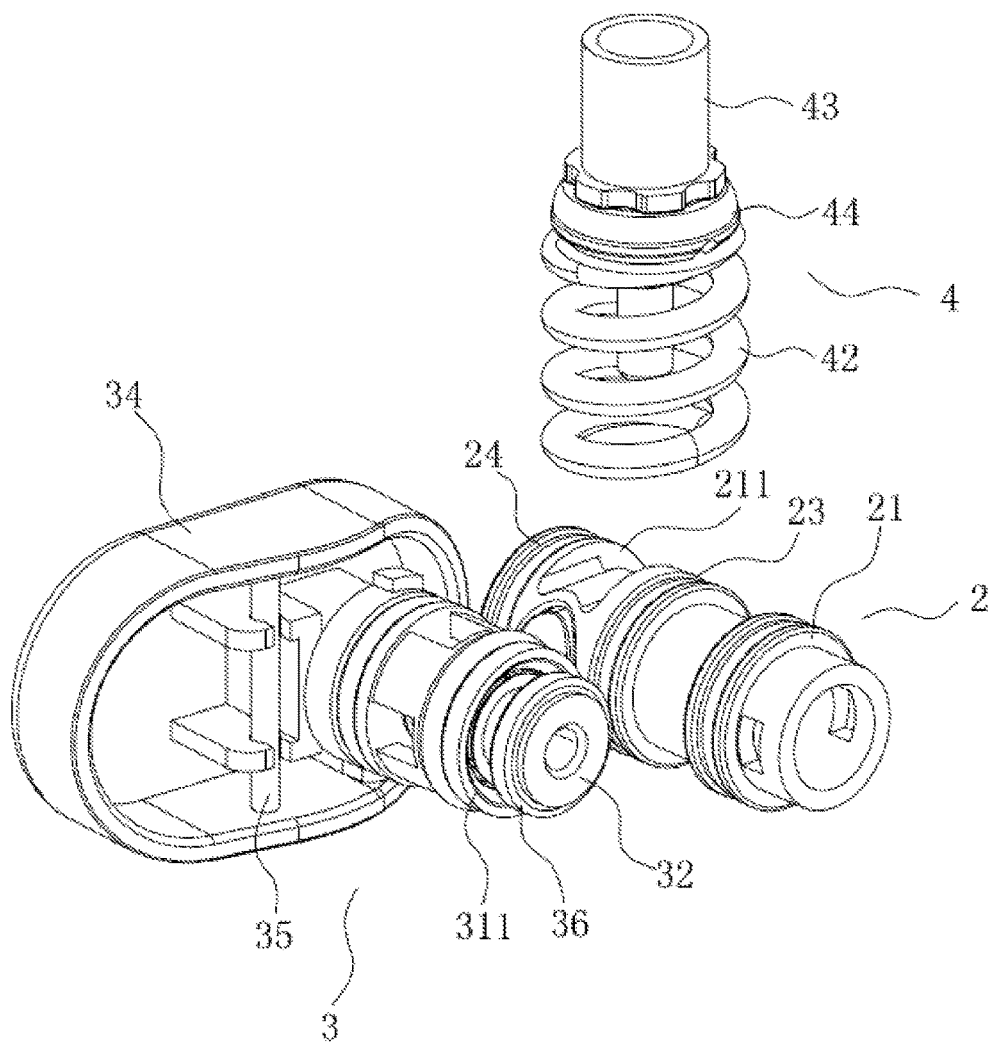
FIG. 6 is another perspective exploded view of some of the components in FIG. 1.

To better understand the technical solution of the present invention, the structure of the present invention will now be detailed in embodiments with reference to the accompanying drawings:

Embodiment 1

As shown in FIG. 1 to FIG. 6, the embodiment discloses a hot and cold water switching valve comprising a valve body 1, a switching valve element 2, a switch valve element 3 and a thermal sensing valve element 4.

Wherein the valve body 1 is provided with an inflow channel 11, a recovery channel 12 and an outflow channel 13, one end of which is communicated in the valve body 1, and the whole valve body 1 is roughly of a "T"-shaped hollow structure.

The switching valve element 2 is provided in such a position where the three channels are communicated with each other in the valve body 1 and used for switching the outflow mode between the recovery channel 12 and the outflow channel 13, wherein the switching valve element 2 comprises a valve rod 21, a knob 22, an "O"-shaped sealing ring 23 and an "O"-shaped sealing ring 24; the valve rod 21 extends axially and an axial end of the valve rod is provided throughout in such a position where the three channels are communicated with each other in the valve body 1, the valve rod 21 located in the valve body 1 is provided with a guide groove 211 (of a plain-sawed structure) which partially extends in the circumferential direction of the valve rod 21, the sealing ring 23 and the sealing ring 24 are axially provided on both sides of the guide groove 211 respectively, the other end of the valve rod 21 is located on the outer side of the valve body 1, the knob 22 is fixedly connected with the valve rod 21, and a limiting device is provided between the knob 22 and the valve body 1 for controlling the rotation angle of the valve rod; specifically, a limiting groove 14 which has an opening angle of 90 degrees is provided on the outer side of the valve body 1, and the knob 22 is provided with a lug (not shown) which is inserted in the limiting groove 14, so when the knob 22 is rotated, the valve rod 21 can only rotate in a range of 90 degrees, so that the communication between the inflow channel 11 and the outflow channel 13 or the recovery channel 12 can be switched by means of the knob 22; the lug and the limiting groove 14 constitute the limiting device.

The thermal sensing valve element 4 is provided in the recovery channel 12 and used for closing the channel when the water temperature is higher than the set temperature, wherein the thermal sensing valve element 4 comprises a spring 41, a thermosensitive spring 42, a mandrel 43, an "O"-shaped sealing ring 44 and a limiting plate 45; the mandrel 43, which is of a cylindrical structure, is movably provided in the recovery channel 12 and is provided with a shoulder 431 in the middle part axially; the recovery channel 12 is provided with a step 121 matched with the shoulder 431; one end of the thermosensitive spring 42 is provided on the inner side of the valve body 1 near the inlet of the recovery channel 12, with the other end provided against one end of the mandrel 43; the limiting plate 45 is provided near the outlet of the outflow channel 12 on the inner side of the valve body 1, with water holes provided on it; one end of the spring 41 is provided on the inner side of the limiting plate 45, with the other end provided against the other end of the mandrel 43, and the sealing ring 44 is provided on the shoulder 431.

The switch valve element 3 is provided in the outflow channel 13 and used for opening or closing the outflow: the switch valve element 3 comprises a valve sleeve 31, a second mandrel 32, a reset spring 33, a button 34 and a pivot 35, wherein the valve sleeve 31 is fixedly provided in the outflow channel 13 and is of a hollowly cylindrical structure, and an inlet is provided in the middle part of the valve sleeve 31 and used to be communicated with the inlet of the outflow channel while an outlet 311 is provided on the axial end of the valve sleeve 31; the mandrel 32 is axially movably provided in the valve sleeve 31, and the axial end of the mandrel 32 is provided with a convex ring 321 matched with the outlet 311 of the valve sleeve 31, with a sealing device 36 provided between the convex ring 321 and the outlet 311 and a button 34 rotatably provided on the outer side of the valve body 1 via a pivot 35, while the other end of the mandrel 32 extends to the outer side of the valve body 1 and is movably connected with the non-pivot part of the button 34 (the movable connection means that when the button 34 is rotated at a small angle relative to the pivot, the mandrel 32 will be axially displaced accordingly); one end of the reset spring 33 is provided against the inside wall near the outlet 311 of the valve sleeve 31 while the other end is provided against the side of the mandrel 32 near the button 34.

The above-described hot and cold water switching valve has two modes of operation: one is that the water can flow directly from the inflow channel 11 to the outflow channel 13 by way of switching the valve element 2 in summer or when no hot water is required, that is, the valve rod 21 is rotated by 90 degrees by way of rotating the knob 22, at which time the opening of the guide groove 211 is downward and the inflow channel 11 and the outflow channel 13 are communicated while the recovery channel 12 is closed; when the water flow reaches the switch valve element 3, the outflow of the outflow channel 12 can be controlled by means of the switch valve element 3, which is just like the known switch of a faucet. The other one is a water-saving mode: when winter comes or when hot water is required, because there is a distance from the water heater to the switching valve and meanwhile the pipeline where the water flows through also needs to be preheated by the water flow, the outflow in the previous period of time needs to be recovered, and in this case the switching valve element 2 can be opened so that the water flow can flow from the inflow channel 11 to the recovery channel 12 for recovery; the specific operation is as follows: the knob 22 is rotated counterclockwise by 90 degrees, at which time the opening of the guide groove 211 faces toward the inflow channel 11 where the water flows from the inflow channel 11 to the recovery channel 12; when the temperature of the water flow reaches a set temperature, such as 45° C., the thermosensitive spring 42 in the recovery channel 12 is heated and extends, with the elastic force greater than the resilience of the spring 41, which pushes the displacement of the mandrel 43 to realize the closure of the shoulder 431 and the step 121 so as to close the recovery channel 12, so in this way hot water will not be wasted; when the water needs to be used, the switching valve element 2 is rotated clockwise by 90 degrees to make the water directly flow from the inflow channel 11 to the outflow channel 13, at which time the recovery channel 12 is closed by means of the switching valve element 2 so that the outflow of hot water in the outflow channel 13 can be opened or closed by means of the switch valve element 3. Specifically, when the button 34 of the switch valve element 3 (near the side connected to the mandrel 32) is pressed, the mandrel 32 is displaced to some extent against the resilience of the reset spring 33; in this case the sealing ring 36 on the convex ring 321 is separated from the outlet 311 of the valve sleeve 31; in this case the outflow channel 13 is opened and the mandrel 32 is kept in an open state since the force of the water flow applied onto the mandrel 32 is greater than the resilience of the reset spring 33, and this is a state of constant outflow of hot water; when the water is not required, the other end of the button 34 is pressed, and in this case the mandrel 32 is subjected to both the resilience of the reset spring 33 and a closing force applied by the button 34 onto the mandrel 32 in the same direction with the resilience, where the two external forces are greater than the reverse force applied by the fluid onto the mandrel 32, so that the sealing ring 36 on the convex ring 321 is engaged with the outlet 311 again to close the outflow channel 13; in this case, because the area of the mandrel 32 where it is subjected to the pressure of water flow is smaller than that when it is in an open state, the insufficient force is unable to open the outflow channel 13 against the resilience of the reset spring 33 so that the outflow channel 13 is kept in a closed state.

Embodiment 2

Figure 7:
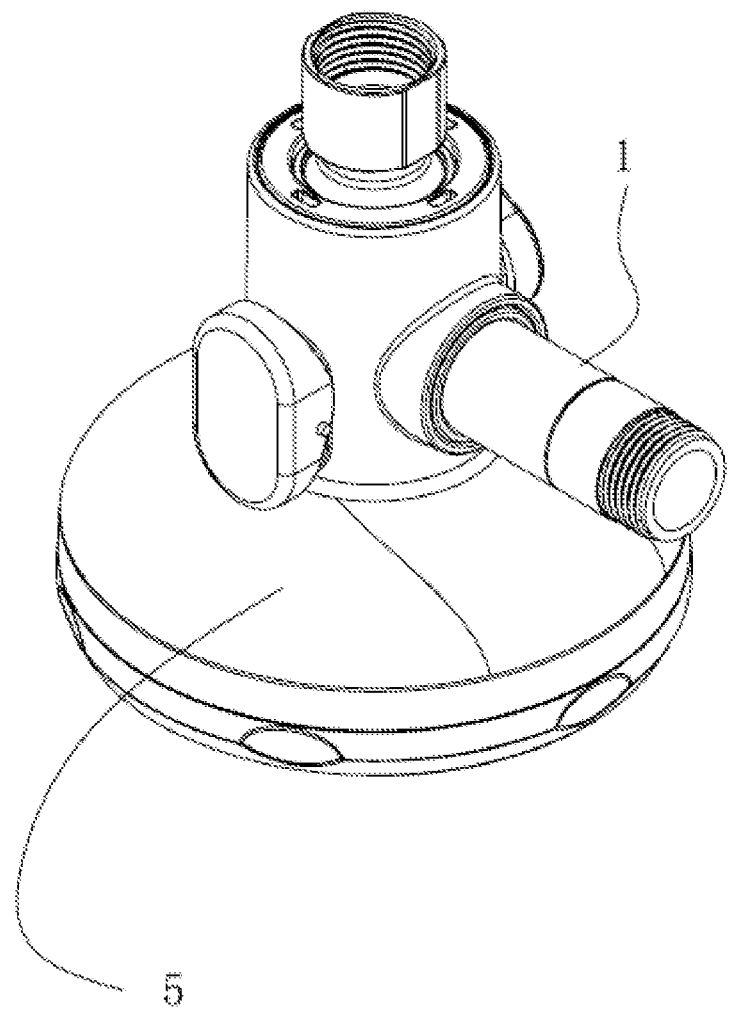
FIG. 7 is a perspective view of Embodiment 2 of the present invention.
Figure 8:
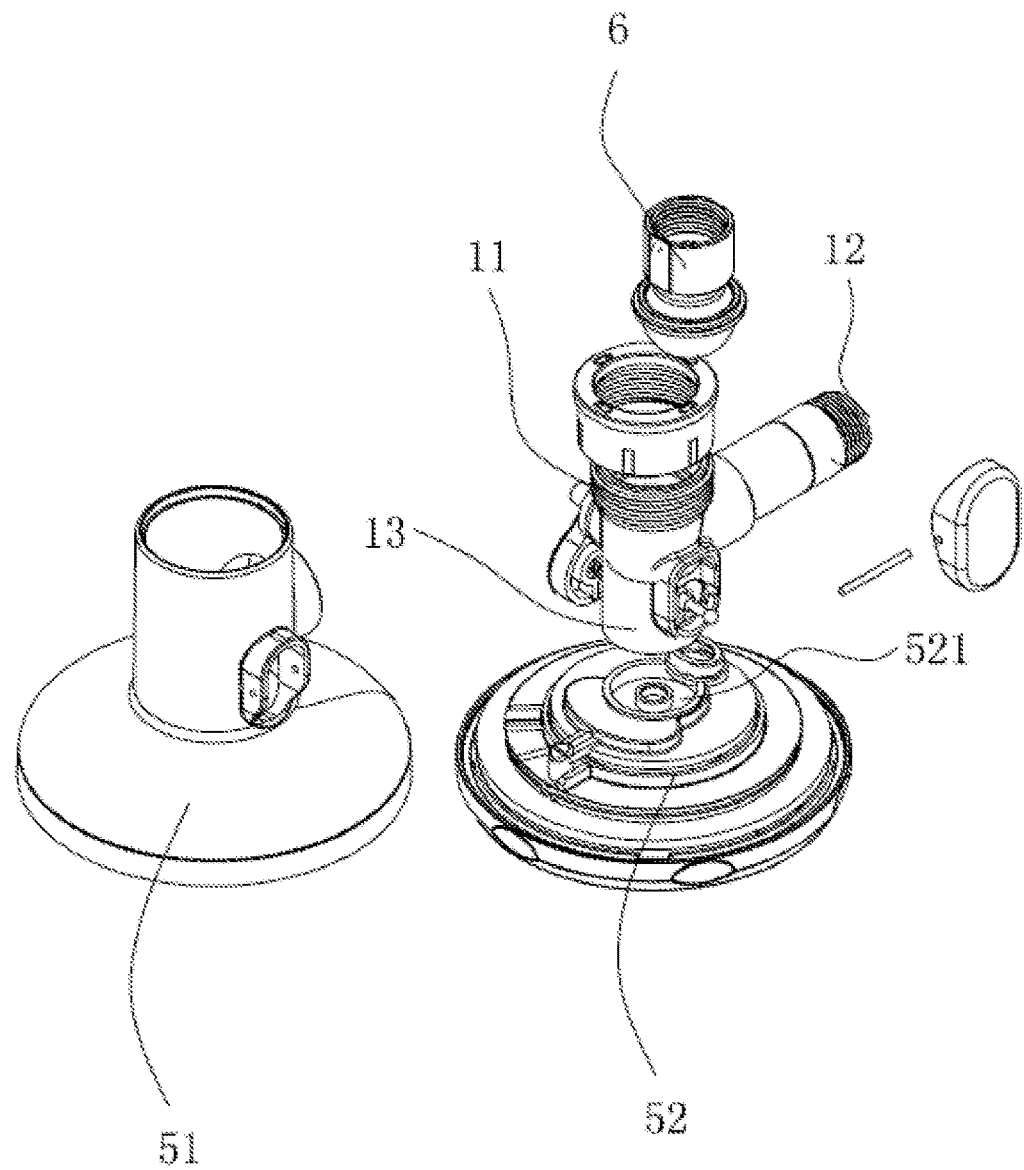
FIG. 8 is an incomplete perspective exploded view of FIG. 7.

As shown in FIG. 7 and FIG. 8, the embodiment discloses a sprinkler used for automatic outflow of cold water comprising a sprinkler body 5 and a hot and cold water switching valve as described in Embodiment 1;

wherein the sprinkler body 5 comprises a sprinkler housing 51 which is provided with a sprinkler waterway assembly 52 comprising a sprinkler inlet 521 and outlet (not shown); the water flows into the sprinkler waterway assembly 52 via the sprinkler inlet 521 to complete the operations such as the water decompression and distribution, and the mixing of water and gas, and then flows out of the sprinkler outlet by way of water flow or spray.

The hot and cold water switching valve is also installed in the sprinkler housing 51 and the inflow channel 11 of the hot and cold water switching valve is connected with a universal joint 6 and is connected to the inflow pipeline through the universal joint 6; meanwhile the outflow channel 13 of the hot and cold water switching valve is connected and communicated with the sprinkler inlet 521 to supply water to the sprinkler waterway assembly; the recovery channel 12 protrudes out of the sprinkler housing 51 for connecting the cold water recovery pipeline.

The present invention boasts the following two advantages: firstly, cold water can be fully recovered while hot water will not be wasted; secondly, it only needs to be adjusted to a hot water mode in use, so that when the temperature reaches the temperature of the hot water, the water will be automatically cut off and users can handle other affairs without waiting, and meanwhile no hot water will be wasted for the purpose of full conservation of water resources.

What is claimed is:

1. A hot and cold water switching valve, characterized by comprising a valve body, a switching valve element, a switch valve element and a thermal sensing valve element, wherein the valve body is provided with an inflow channel, a recovery channel and an outflow channel; one end of the three channels is communicated in the valve body; the switching valve element is provided in such a position where the three channels are communicated with each other in the valve body and used for switching the outflow mode between the recovery channel and the outflow channel; the switch valve element is provided in the outflow channel and used for opening or closing the outflow, and the thermal sensing valve element is provided in the recovery channel and used for closing the channel when the water temperature is higher than the set temperature.

2. The hot and cold water switching valve as claimed in claim 1, wherein the switching valve element comprises a valve rod, a knob and two sealing rings, wherein the valve rod extends axially and an axial end of the valve rod is provided throughout in a position where the three channels are communicated with each other in the valve body; the valve rod located in the valve body is provided with a guide groove which partially extends in the circumferential direction of the valve rod; the two sealing rings are axially provided on both sides of the guide groove respectively; the other end of the valve rod is located on the outer side of the valve body; the knob is fixedly connected with the valve rod, and a limiting device is provided between the knob and the valve body for controlling the rotation angle of the valve rod.

3. The hot and cold water switching valve as claimed in claim 2, wherein the valve body is provided with a limiting groove which has an opening angle of 90 degrees; the knob is provided with a lug which is inserted in the limiting groove; the lug and the limiting groove constitute the limiting device.

4. The hot and cold water switching valve as claimed in claim 1, wherein the thermal sensing valve element comprises a spring, a thermosensitive spring and a mandrel, wherein the mandrel is movably provided in the recovery channel and has a shoulder in the middle thereof; one end of the thermosensitive spring is provided on the valve body near the inlet of the recovery channel, with the other end provided against one end of the mandrel; one end of the spring is provided on the valve body near the outlet of the recovery channel, with the other end provided against the other end of the mandrel; the recovery channel is provided with a step matched with the shoulder, and a sealing device is provided between the shoulder and the step.

5. The hot and cold water switching valve as claimed in claim 1, wherein the switch valve element comprises a valve sleeve, a second mandrel, a reset spring and a button, wherein the valve sleeve is fixedly provided in the outflow channel and is of a hollowly cylindrical structure, and an inlet is provided in the middle part of the valve sleeve while an outlet communicated with the inlet is provided on the axial end of the valve sleeve; the second mandrel is axially movably provided in the valve sleeve, and the axial end of the second mandrel is provided with a convex ring matched with the outlet of the valve sleeve, with a sealing device provided between the convex ring and the outlet; a button is rotatably provided on the outer side of the valve body via a pivot, and the other end of the second mandrel extends to the outer side of the valve body and is movably connected with the button; one end of the reset spring is provided against the inside wall near the outlet of the valve sleeve while the other end is provided against the side of the second mandrel near the button.

6. The hot and cold water switching valve as claimed in claim 4, wherein the switch valve element comprises a valve sleeve, a second mandrel, a reset spring and a button, wherein the valve sleeve is fixedly provided in the outflow channel and is of a hollowly cylindrical structure, and an inlet is provided in the middle part of the valve sleeve while an outlet communicated with the inlet is provided on the axial end of the valve sleeve; the second mandrel is axially movably provided in the valve sleeve, and the axial end of the second mandrel is provided with a convex ring matched with the outlet of the valve sleeve, with a sealing device provided between the convex ring and the outlet; a button is rotatably provided on the outer side of the valve body via a pivot, and the other end of the second mandrel extends to the outer side of the valve body and is movably connected with the button; one end of the reset spring is provided against the inside wall near the outlet of the valve sleeve while the other end is provided against the side of the second mandrel near the button.

* * * * *